Sept. 15, 1964     H. L. McFEATERS ET AL     3,149,191
FURNACE INSTALLATION
Filed Oct. 28, 1959     8 Sheets-Sheet 3

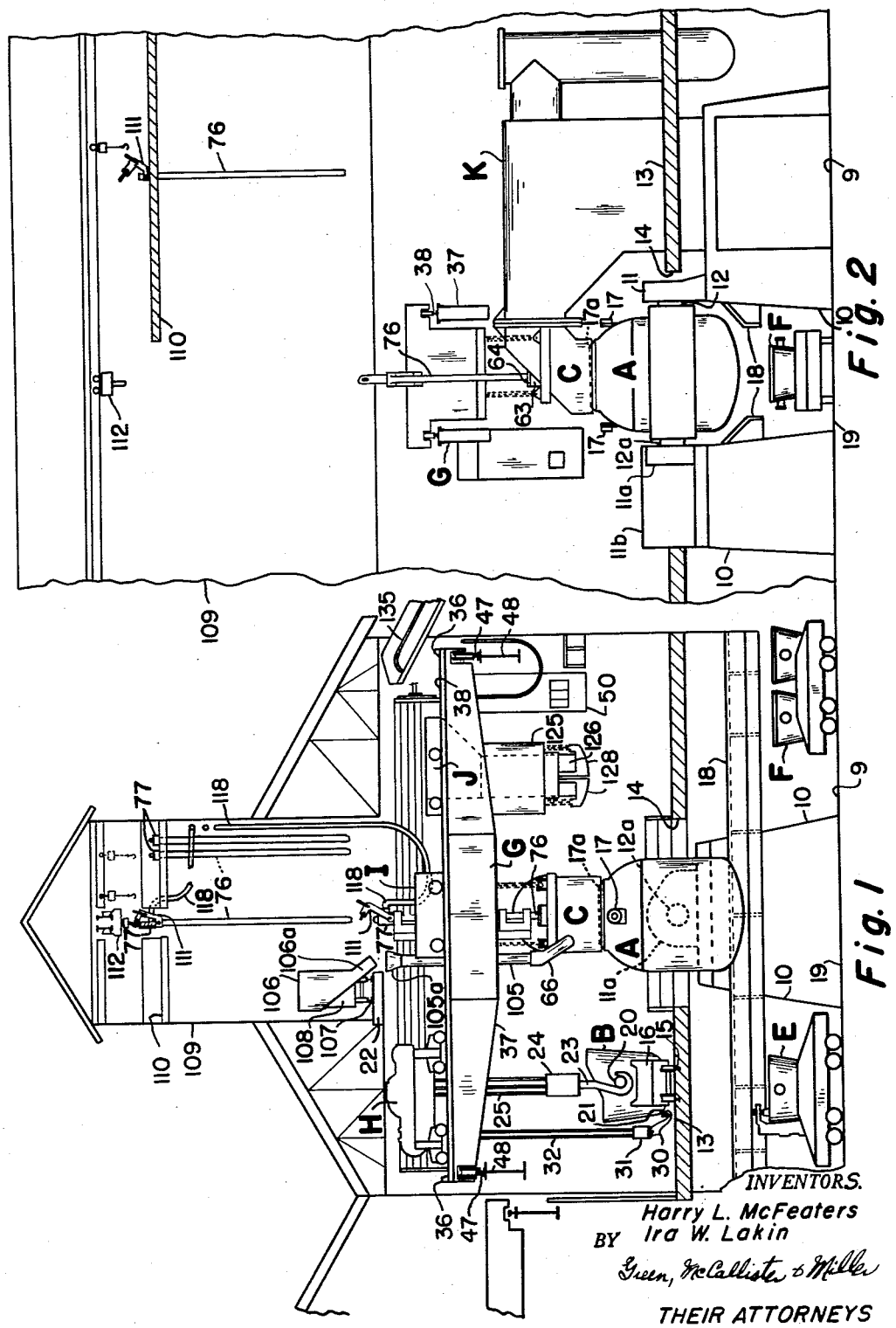

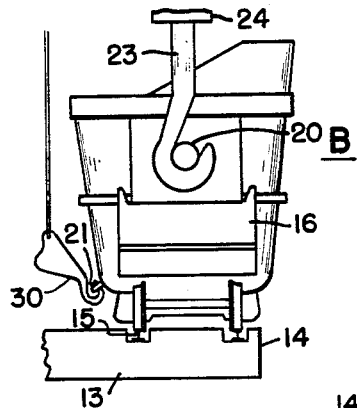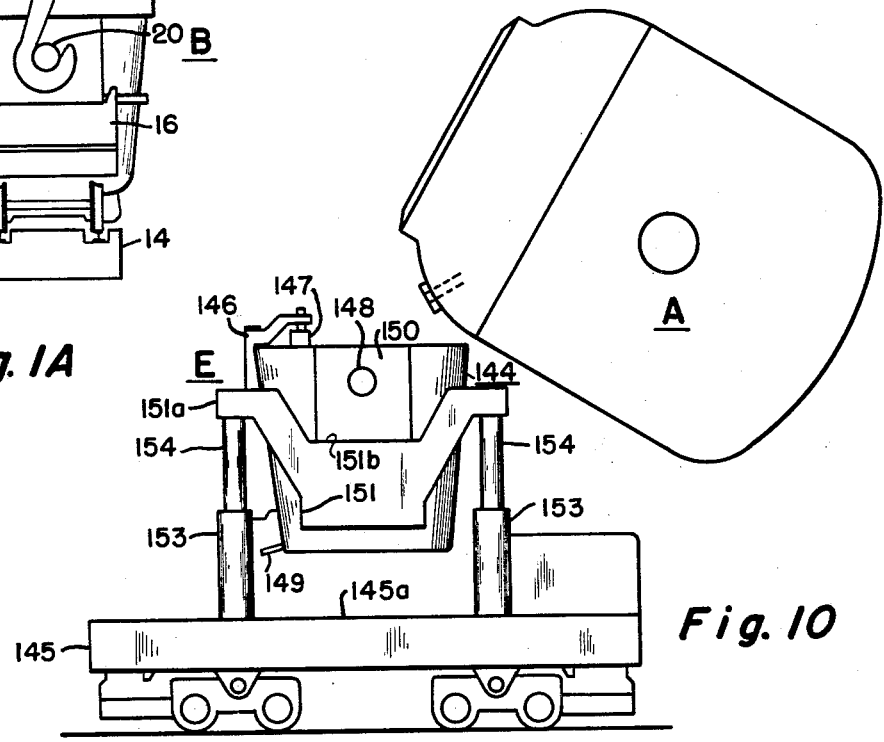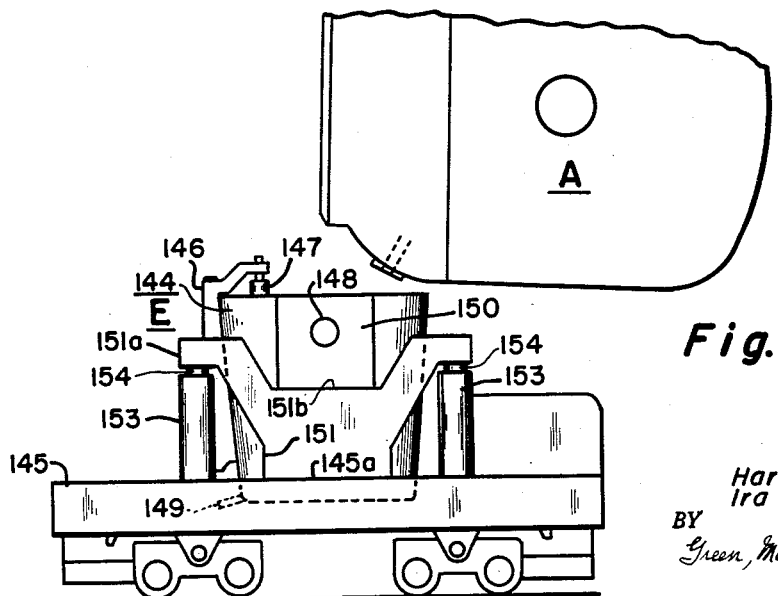

INVENTORS.
Harry L. McFeaters
Ira W. Lakin
BY Green, McCallister & Miller

THEIR ATTORNEYS

INVENTORS.
Harry L. McFeaters
Ira W. Lakin
BY
THEIR ATTORNEYS

INVENTORS.
Harry L. McFeaters
Ira W. Lakin
BY
Green, McCallister & Miller

THEIR ATTORNEYS

United States Patent Office 3,149,191
Patented Sept. 15, 1964

3,149,191
FURNACE INSTALLATION
Harry L. McFeaters, New Castle, and Ira W. Lakin, Volant, Pa., assignors to Pennsylvania Engineering Corporation, New Castle, Pa., a corporation of Pennsylvania
Filed Oct. 28, 1959, Ser. No. 849,207
7 Claims. (Cl. 266—13)

This invention relates to a furnace installation, system, layout or operation that is particularly suitable for utilization with so-called converter or oxygen blow vessels or furnaces.

A phase of our invention relates to a flexible and compact operating or servicing layout for charging, blowing, and making additions to the melt of, carrying off flame and effluent gases from, pouring, and operating as well as repairing tiltable or rotatable furnace vessels.

In carrying out our invention, we employ an overhead assembly having a runway for carrying at least one operating unit, which may be moved on the runway into and out of cooperative alignment with at least one furnace vessel, and which has means for contributing to the operation or maintenance of the vessel. The runway is shown in the form of a frame which, itself, is movable, for example, on an overhead runway between one or more furnace stations. We have also shown a plurality of operating units on the first-mentioned runway, each of which may be moved therealong, together with each other as unit pairs or groups, or separately-independently, to facilitate operations involved in the employment of furnace vessels for refining metal. In addition, one or more of the operating units may have hoist (raising and lowering) or delivery means associated therewith. The operating units are shown as comprising self-propelled trolley units that may be centrally-controlled by an operator as to their respective movements and with respect to the operation of means carried thereby.

Tracks are shown for charging, teeming and slag car units which are preferably self-propelled for independent operation. One of the cars carries a teeming ladle that, as shown, may be raised and lowered with respect to the furnace to facilitate pouring the refined metal therefrom and in such a manner as to minimize metal drop. This feature is particularly important due to the general trend towards larger capacity furnaces, thus normally involving an increase in drop distance of the blown metal during the pouring operation. The increase of drop tends to cause excess wear on the teeming ladle lining and, in turn, to impart impurities to the steel, with an increased possibility of pick-up of harmful atmospheric gases, such as nitrogen during the pouring operation. By providing means for raising and lowering the ladle to "track" the furnace pouring nozzle, we minimize blow metal drop and avoid the difficulties heretofore encountered as to increased drop distances.

Employing our system, layout, operation or construction, we have been able to utilize one overhead movable assembly for a pair of furnace vessels and to make possible the selective charging of each furnace, blowing the metal content thereof, adding scrap as well as additive materials, and to carry off hot effluent gases therefrom, all by means of units carried by the assembly. The assembly is adaptable for moving one of the units between one furnace and a continuous scrap supplying conveyor. In addition, the system is so constructed and arranged that, during a blowing operation, there may always be a second oxygen blow lance fully connected and in an aligned and readily available position for immediate movement into an oxygen blow position when the lance that is being used has to be replaced. This makes possible a change of lances during a melting operation without cooling down the melt when the first lance has been used up.

It has thus been an object of our invention to provide a flexible and efficient system or layout for controlling or coordinating the servicing, operation or utilization of a furnace vessel having an open mouth portion that normally faces substantially upwardly when in a metal refining position;

Another object of our invention has been to provide a furnace vessel operational control layout or system that is adaptable for servicing a series of furnaces without interference between the servicing units or between the operation of one furnace vessel and that of another;

A further object of our invention has been to devise an overhead servicing control assembly or operating construction for furnace vessels to facilitate various operations of the furnace and in a selective or progressive manner;

These and other objects of our invention will appear to those skilled in the art from the drawings chosen to illustrate its principles and in which FIGURE 1 is a front view in elevation of a system, plant layout or installation employing our construction;

FIGURE 1A is an enlarged front view in elevation of a charging ladle shown in FIGURE 1;

FIGURE 2 is a fragmental view in elevation which may be termed a side view and is taken at right angles to and on the same scale as FIGURE 1;

FIGURE 6A is a plan view of the scale of FIGURE 6 and constituting a continuation thereof to illustrate the right hand portion of the assembly and operating units carried thereby;

FIGURE 7 is a vertical side section in elevation of a slightly enlarged scale as to FIGURES 6 and 6A, taken along the line VII—VII of FIGURE 6A, and illustrating details of a hood and lance control (raising and lowering) unit of the assembly;

FIGURE 8 is a fragmental horizontal section of the scale of and taken along the line VIII—VIII of FIGURE 7;

Figure 15:
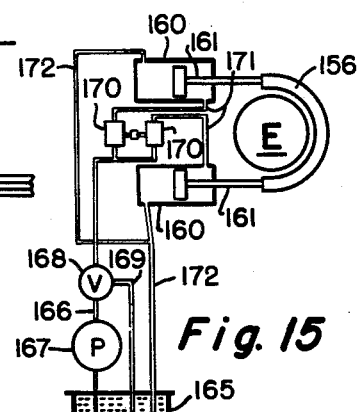

And, FIGURE 15 is a hydraulic schematic view illustrating a suitable operating system for controlling the movement of the ladle of the ladle units.

Referring particularly to FIGURES 1 and 2, we have shown a furnace or vessel A, such as of an oxygen-blow type, which, as customary, is tiltable about its trunnions 12 and 12a, and which is positioned above a kitchen floor or furnace asile 9, within a central passageway 14 through a working floor 13.

B represents a charging ladle unit which is positioned on a transfer car or truck 16 that is movable, preferably in a self-propelled manner, by a conventionally-connected electric drive motor positioned thereon. As shown in FIGURES 1 and 1A, the wheels of the car 16 are adapted to ride transversely of FIGURE 1 on a track 15 which is mounted on the working floor 13. The ladle shown in FIGURES 1 and 1A has a pair of opposed side trunnions or pins 20 projecting therefrom to receive a pair of ladle hooks 23 of a hoist of an overhead trolley unit H, so that it may be vertically lifted to a proper position to pour or charge molten metal into the vessel A. The ladle also has a bottom eyelet 21 projecting therefrom to receive a hook 30 of an auxiliary tilting hoist also carried by the unit H. The unit H, as shown, may be moved longitudinally of FIGURE 1, to and from the vessel A, to effect the pouring operation when the vessel is in a substantially upright position and an exhaust hood C has been raised out of position with respect thereto.

The vessel or furnace A is also provided with upper trunnions 17 that are mounted on its nose part to receive hoist hooks when the nose part is to be lifted out of position with respect to the body of the vessel for repair or replacement of its refractory lining. In this connection, the pair of hooks 23 of the hoist unit H may be used. As disclosed particularly in FIGURE 2, the trunnions 12 and 12a are carried in mounts 11 and 11a for tilting and rotative movement. It will be noted that the mounts 11 and 11a are positioned on a pair of spaced-apart, upright, refractory-faced piers 10. A pair of longitudinally-extending, spaced-apart, deflector shields 18 are secured to project inwardly from the piers 10 to deflect debris directly into the trash pit and to protect any cables or collector rails that may be positioned to extend along the piers beneath the deflectors. The trunnion 12a is driven by a drive mechanism 11b in a conventional manner for effecting its tilting operation or rotation, as desired. As shown, the piers 10, in effect, define a trash pit.

When a vessel A is in its refining or blowing position illustrated in FIGURES 1 and 2, a fluid-jacketed (cooled) exhaust hood C is positioned to align with and fit over and on the lip of its nose portion and to also align with and fit with a sealing flange of a fume and gas receiving apparatus K which is employed for cooling and conditioning the effluent gases, removing dust particles, etc., before the gases are released to the atmosphere. An overhead hood, lance and addition control (operating) unit or trolley I of a self-propelled type is carried centrally by an overhead traveling bridge frame or girder (runway) structure G and has means for moving or raising and lowering the hood C simultaneously into and out of a gas and flame sealing-off relationship from the standpoint of its bottom (inlet) and upper or side (outlet) flanges with respect to the vessel A and the effluent receiver K. The unit I also is shown as carrying means for positioning, guiding and clamping an oxygen lance 76 which may extend through the hood C in a sealed relationship therewith and into a vessel A to effect a blow-refining operation.

A set of flexible, oxygen-supply and circulating-cooling-fluid hose connection 118 (see FIGURES 1 and 6A) are provided for at least two lances 76. Each set 118 has an oxygen supply pipe or tube, a cooling fluid supply pipe or tube, and a warm fluid exhaust pipe or tube. A transfer bail 111 (see FIGURE 9) has a side eyelet 111c for receiving the hook 112a of a lance service hoist 112 which is rail-mounted by its flanged wheels 113 in a lance loft or upper portion of the building enclosure 109 to move on a track 114 transversely of FIGURE 1 and to raise a lower lance 76 out of position and replace it with a new lance 76 which is also shown in FIGURES 1, 2, 5 and 7. The second lance is held in an above-aligned relationship within the lance loft 109, with its fluid connections made, so that it can be quickly inserted without wasting time when the lance being used has to be replaced.

Also, in FIGURE 1, we have shown a short length additive spout portion 66 which is secured to and projects through the wall of the hood C and upwardly thereabove to slidably telescope with or over a vertical feed or delivery pipe or tube 105 that is carried by and may be fixed on the unit I. The spout 66 is preferably water-jacketed and is employed to feed additive material delivered from an additive hopper 106, as needed, during the refining operation. It will be noted that the hopper 106 is carried on a cart 109 that has flanged wheels for moving it along tracks 107, transversely of FIGURE 1, and that its delivery nozzle portion 111 is adapted to feed into a funnel portion 105a of the delivery or feed pipe 105 from a position within the loft 109 when the unit I has the aligned relation of FIGURE 1.

For supplying or charging the vessel A with scrap metal, we have provided a third overhead unit or trolley J which is also self-propelled with respect to and is carried by the overhead runway or frame G. The unit J, as shown particularly in FIGURES 1, 3, 4 and 6A, is adapted to be charged by a continuous conveyor 135 when the unit J has been moved to one end of the runway or frame structure G and the structure G has been moved to an intermediate position, such as (1) of FIGURE 4. When the structure G is moved longitudinally, either to a position (2) or (3) of FIGURE 4 for overhead furnace alignment, a pair of pivoted clam shell gates 128 for a scrap bucket 126 of the unit J (see FIGURE 5) may be opened when the units H and I have been moved to one side, for example, to the left of FIGURE 5, and the unit J has been propelled to a position in alignment with the vessel A. After scrap metal has been charged, the unit J then may be moved to one side, as to the right hand charging position of FIGURE 5.

Figure 4:
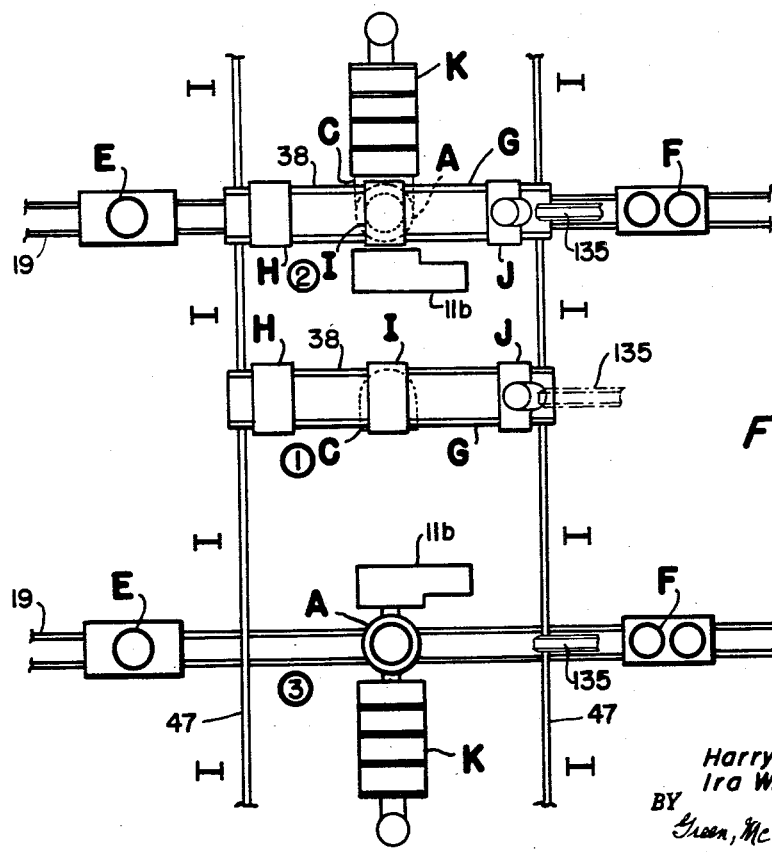
FIGURE 4 is a plan view of a furnace installation employing one assembly for a pair of furnaces and illustrating how additional assemblies may be used in-line for additional, longitudinally-spaced-apart furnace installations; this view is greatly reduced and somewhat diagrammatic.

As illustrated in FIGURES 1 and 4, a self-propelled teeming ladle cart or truck unit E and a self-propelled tilting slag car unit F (of conventional construction) are mounted for longitudinal movement in alignment with the furnace vessel A on a track 19 that is positioned on the kitchen floor or furnace aisle 9. As shown particularly in FIGURE 2, the cart units E and F are adapted to move along a corridor defined by supports for the working floor 13 and refractory-faced support piers for the drive mechanism of the vessel A. This provides an extremely compact construction of a type that contains all the essential units for the charging operation of the vessel and, in such a manner, as to conserve plant space and make possible the operation of a series of longitudinally spaced-apart vessels A, as illustrated in FIGURE 4. It also makes maximum use of available overhead space and minimizes overhead clearance requirements. One overhead traveling structure G may ordinarily serve two vessels A, on the basis that, in most installations, one vessel is down for relining and maintenance, while the other is being used. However, from a study of FIGURE 4, three or more vessels may be served by two or more assemblies and employing the same longitudinal runway or track therefor. Additional transversely spaced furnaces can also be served by additional, longitudinal runways or tracks having one or more assembly, each employing a moving unit such as G and carrying units such as H, I and J.

The operation of the system or layout may be controlled electrically in an operator's pulpit 50 by conventional means. The pulpit is suspended from a corner of the traveling bridge frame, runway or support structure G (see FIGURES 1, 5 and 6A). Also, as illustrated, the structure G may be provided with an upper walk platform 51 adjacent to and above the operator's pulpit 50 (see FIGURE 6A).

Figure 9:
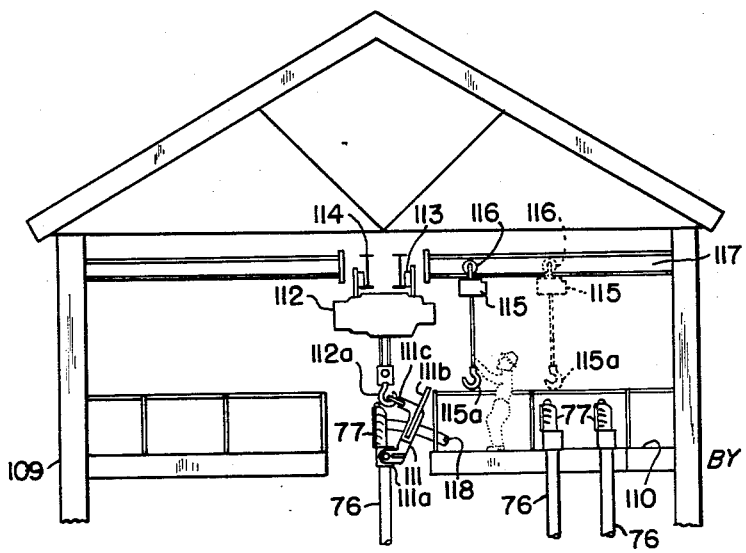
FIGURE 9 is an enlarged fragmental side view of an upper or lance loft portion of the installation of FIGURE 1.

An upper lance loft platform 110 is provided for an operator to make the necessary cooling water inlet and outlet connections 118 to removable upper heads 77 of the lances, and to connect a transfer bail 111 thereto, as illustrated particularly in FIGURE 9. As shown in this figure, the lance hoist 112 is of a traveling type. Spare or extra lances 76 may be suspended from their heads 77 along a longitudinal slot in the floor 110, so that one set of fluid connections 118 may be secured or connected to the head 77 of a forward or selected lance 76 by the operator after the top eyelet in the head 77 of such lance has been engaged by the hook 115a of a trolley-suspended monorail hoist 115 to lift and move it to a convenient inner position, towards the inner open end of the slotted portion of the floor 110. The operator may then mount the transfer bail 111 on the head 77 and using the hoist 115, move the selected lance to a "ready" position substantially in alignment above the vessel A with which it is to be later employed. If desired, a second hoist 115 may be provided for the left half (as to FIGURE 9) of the floor 110 to service used or additional lances that may be suspended from its inwardly-open-end longitudinally slotted portion. As indicated, the monorail hoist 115 has flanged wheels 116 adapted to operate along a flanged I-beam or girder track or runway 117 of the lance loft 109.

The traveling bridge or girder frame structure G is driven, as shown particularly in FIGURE 6A, by a reversible electric motor 52, as controlled by a magnetic brake 52a. The other end of the drive shaft of the motor 52 is connected through a coupling to a reduction gear unit 53 and from such unit to couplings for a longitudinal drive shaft 54 that is journaled on the frame of the overhead traveling bridge G. The structure G is provided with freely rotatable flanged track wheels 55 and driven flanged wheels 55a which are mounted on extensions of the drive shaft 54, so that the crane may be moved transversely along a track or runway 47 that is carried on transverse support girders 48 of a stationary structure of the plant.

Figure 3:
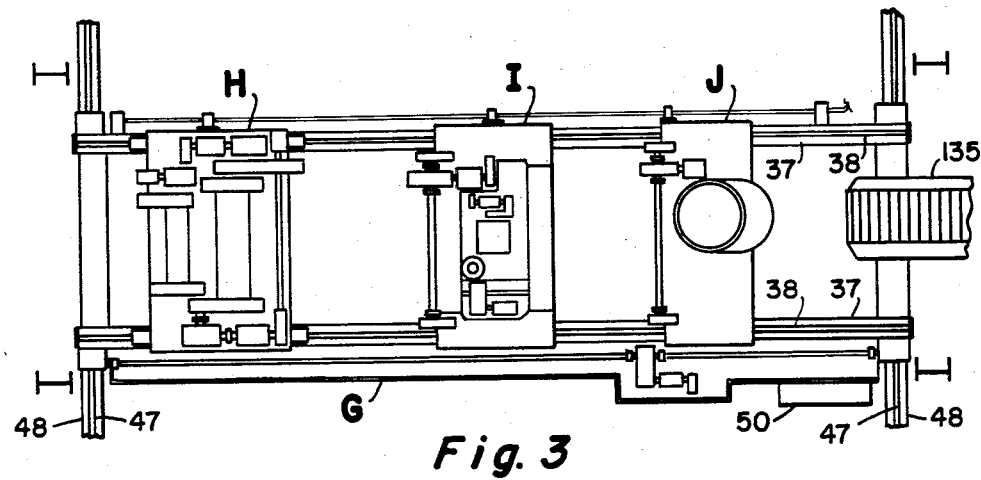
FIGURE 3 is a slightly enlarged top plan view of an assembly of our invention in the nature of a girder crane that carries operating units thereon for the furnace vessels.
Figure 5:
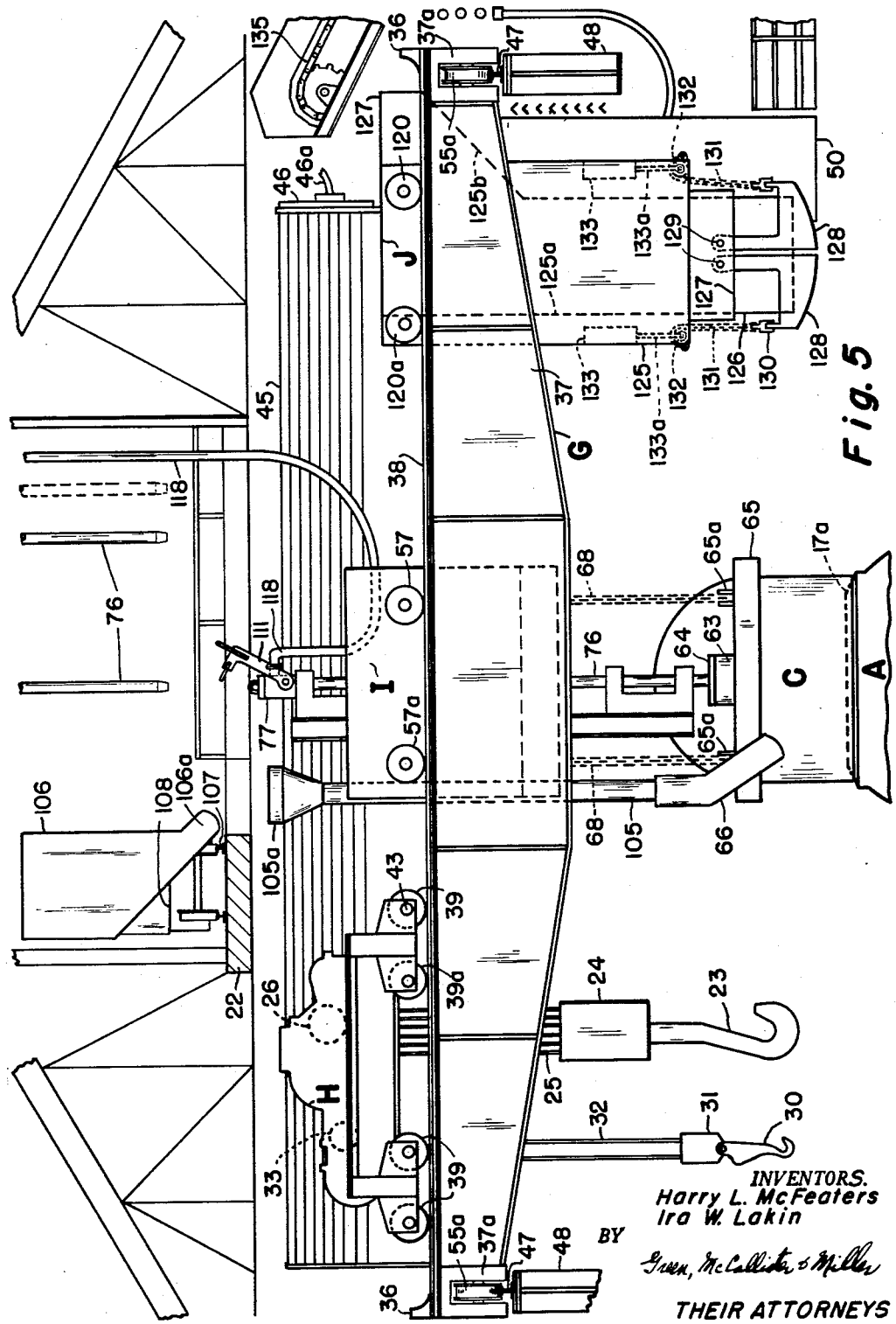
FIGURE 5 is an enlarged side vertical view in elevation of the assembly of FIGURES 1 and 3, illustrating details of the runways and of the frames or operating units carried thereby.

Referring particularly to FIGURES 1, 3, and 5, the trolley unit H has a winding drum 26 for the pair of cable groups 25 that carry ladle bails 24 which are adapted to raise and lower the charging ladle B into and out of position with respect to its carriage, truck or cart 16. A reversible electric motor 27 is shown mounted on the platform of the unit H to drive the hoist drum 26 through a reduction gear unit 28, suitable couplings, and a gear set 29. A magnetic brake 27a is connected to the other end of the shaft of the motor 27 in order to maintain it in or lock it in a desired position from the standpoint of a suitable supporting relationship for the pair of cable groups 25. An auxiliary hoist cable group 32 carries the tilting hook 30 and has a bail 31. The cable group 32 is interleaved over a secondary drum 33 of the unit H. A reversible electric motor 34 is positioned on the structure of the unit H and is connected through a gear reduction unit 34a, a coupling, and a gear unit or set 35 to actuate the drum 33, in order to raise and lower the auxiliary or tilt cable group 32, as desired.

Figure 6:
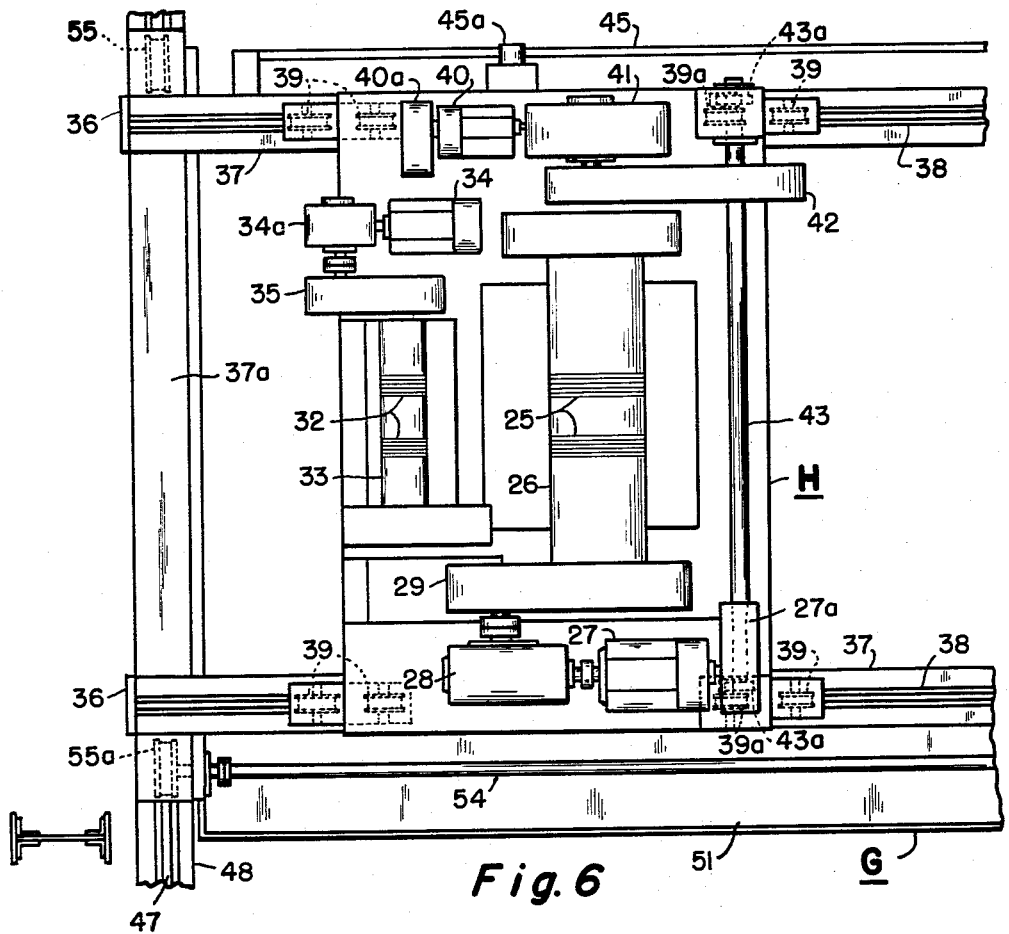
FIGURE 6 is a plan view on the left-hand portion of the assembly of FIGURE 5, enlarged with respect to such figure, and particularly illustrating a pouring ladle control (hoist and tilt) unit that is operatively carried thereby.

The unit H, as shown particularly in FIGURES 5 and 6, is mounted on a pair of longitudinal runway tracks 38 that extend along girders 37 of the overhead frame structure G. Maximum endwise or longitudinal movement of the units along the tracks 38 is limited by end stops or bumpers 36. It will be noted that the spaced-apart side girders 37 of the overhead frame G are connected together transversely by cross girder members 37a secured thereto to form a rigid support frame.

The unit H has free-rolling flanged wheels 39 that ride along the tracks 38, and has positively driven flanged wheels 39a. A reversible electric motor 40 is mounted on the platform of the unit H and has a magnetic position-hold brake 40a connected to one end of its shaft. The other end of the motor shaft is connected through a gear reduction unit 41 and a gear unit or set 42, to a cross drive shaft 43 that is journaled on the unit. Gear units 43a operatively connect each end of the drive shaft 43 to actuate stud shafts fixed to and extending from the driven trolley wheels 39a.

It is thus apparent that the unit H can be driven by the motor 40, as energized by electrical slide-contact connectors 45a, to any desired position along the extent of the traveling bridge frame or structure G, and may be driven with or independently of the other two units I and J. The units I and J also have electrical slide contact connectors 45b and 45c which also slide along trolley collector rails 45 that are fixed to or mounted on and project upwardly along a back girder of the traveling structure G, see particularly FIGURES 5, 6 and 6A.

An end collector block 46 is provided to which flexible electric cables 46a may be connected and from which they may extend to controls in the operator's pulpit 50. Any suitable electrical connection system of conventional type may be employed for supplying energizing current to the units G, I, and J, to control their movement along the structure G, as well as to control the operation of their mechanisms, such as the operation of the hoist drums 26 and 33 of the unit H.

The trolley unit I (see FIGURE 6A) which is intermediate the units H and J, has freely journaled, flanged track wheels 57 and positively-driven flange track wheels 57a that engage the track rails 38. A reversible electrical motor 58 is mounted on the frame structure of the unit I, is provided with a magnetic brake 58a, and is connected through couplings to a reduction gear unit 59, cross drive shaft 60, and gear units or sets 61 to the stud shafts that are fixed to and extend from the driven trolley wheels 57a to actuate them.

As shown particularly in FIGURES 2, 5 and 7, the hood C has a substantially angular-shaped, jacketed, peripherally-enclosing body or shell wall that defines a passageway therethrough, and has a bottom flange or nose portion adapted to cooperate with or closely fit over and seal with a lip edge 17a of the nose of a furnace vessel A. At its other end, the hood C has a flange to closely slide-fit and seal with an inlet flange of the effluent-receiving unit K. The hood C is also provided with an upwardly-projecting open port portion 63 which, like the hood body or shell, may be water-jacketed, and is adapted to receive a lance 76 therethrough. A cooling-fluid-jacketed closure gate 64 that may be of a type disclosed in the McFeaters co-pending application No. 722,257 of March 18, 1958, now U.S. Patent 3,026,102, is adapted to clamp about the lance 76 and seal-off the entrance port portion 63 when effluent is flowing from the vessel A. Details of such a gate construction are fully disclosed in FIGURES 19 to 21 of the above-mentioned McFeaters application.

A rim ring or band 65 (see FIGURES 5 and 7) extends somewhat centrally about the hood C to reinforce it and provide a platform that carries anchor lugs 65a. The lugs 65a are employed to raise and lower it into and out of an effluent-flow connecting relationship between the vessel A and the receiver K. It will be noted that the lugs 65a are located in opposed pairs adjacent opposite sides of the hood to provide a balanced supported relationship of the hood, see also FIGURE 6A. A front hood hoist chain pair 68 (see FIGURE 7) is mounted on a front pair of lugs 65a and extend upwardly to pass over sprocket wheels 70 that are carried by mounts 69 on the frame of the unit I. In a like manner, a rear pair of hoist chains 68a are mounted on a rear pair of lugs 65a and extend upwardly and pass over sprockets 70a that are positioned by rear mounts 69a. A front chain 68, as well as a back chain 68a of the same construction and mounting are, in each case, secured at opposite sides of the hood at their upper ends to a bifurcated connector 71 (see FIGURE 6A), so that each side of the hood is carried by a pair of front and back chains and a common connector 71 (see also FIGURE 7).

A link 72 (see FIGURE 6A) is pivotally connected between connector 71 and one end of each pair of hoist cranks 73 by a pin or crank shaft 74. The other end of an outer crank 73 of each pin has a stub shaft journalled in an outer bearing 80; the other end of an inner crank 73 of each pair is secured on drive shaft 81 to swing the pair of cranks from the position of FIGURE 7 to an opposite horizontal position, so as to raise and lower the hood C. The coupled shaft assembly 81 (see FIGURES 6A and 7) is actuated by a reversible motor 82 through a gear unit 83 and couplings. The outer ends of the shaft assembly 81 are journalled in inner bearings 80a.

The trolley unit I is actuated by a reversible electric motor 58, as controlled by a magnetic brake 58a, through gear unit 59, couplings, cross drive shaft 60, and gear reduction units 61 that are connected by stub shafts to driven trolley wheels 57a.

In FIGURES 7 and 8, I have shown apparatus for holding and positioning the lance 76 in such a manner that it can be raised and lowered with respect to the vessel A, depending upon whether the refining of metal is to be or has been accomplished in the vessel. This apparatus includes clamping finger means 88 and 88a which has upper and lower sets of clamping fingers to grasp about the lance. It will be noted that one set of fingers 88a (see FIGURE 8) is pivoted with respect to the other 88 by pins 90, and that both sets may be removably secured or clamped together about the lance 76 by nut and bolt assemblies 89. A winding drum 85 (see also FIGURE 6A) is rotatably positioned on an extension of the fixed frame 99 of the unit I, and a pair of guide channels 97 of a vertically-depending fixed guide frame project upwardly from the opposite end of a shaft of the drum 85 and are secured to the frame 99 of the trolley unit I. A raising and lowering cable 100 is interleaved for winding on the drum 85, passes over pulleys 103, 102 and 101, and is anchored at its upper end to anchor or eyelet means 91a on the top of a vertically-movable traveling carriage 91 to raise and lower the latter. The drum 85 is actuated by a reversible electric motor 86 (see FIGURES 6A and 7) having a magnetic brake 86a and through a chain drive 87. The opposite end of the cable 100 is anchored at 91b, so that the cable 100 is, in effect, secured to top and bottom portions of the traveling carriage 91. The clamping fingers 88 and 88a are carried by the traveling carriage 91.

As shown in FIGURE 8, a pair of transverse stud shafts 92 extend from opposite sides of the carriage 91 and have beveled guide rollers 93 that are rotatably carried thereon and ride in vertical guide channels of a movable guide extension frame 94. A bifurcated outwardly-projecting bracket 94b at the lower end of an outer channel of the guide extension frame 94 (see FIGURE 7) provides a mounting for pulley 102. The guide extension frame 94 has a pair of outwardly-projecting stud shafts 95 (see FIGURE 8) fixed thereto and rotatably carrying beveled guide rollers 96. The guide rollers 96 are adapted to ride along the fixed guide channels 97 that are secured to the fixed frame structure 99 of the trolley unit I. An outer fixed guide channel 97 has an outwardly projecting bifurcated bracket 97a that rotatably carries the pulley 103. An outer channel of the guide extension frame 94 has an upper bifurcated bracket 94a to rotatably carry the pulley 101.

From the above description, it will be apparent that the lance 76 of FIGURES 7 and 8 may be quickly and easily moved from a lowered-operating or furnace-blowing position by opening the hood gate 64 and actuating the motor 86 to wind the cable 100 about the drum 85, see also FIGURE 6A. In this manner, the lance 76 can be raised to its upper position of FIGURE 7 wherein its end fully clears the upper nose part of the vessel A, so that the vessel can be rotated or turned to pour metal and slag, etc.

Referring to FIGURES 5 and 6A, the trolley unit J has a frame structure carrying freely journalled flanged track wheels 120 and driven flanged track wheels 120a which ride along track rails (runway) 38 of the overhead runway, bridge frame or support structure G. A reversible electric motor 121 is mounted on the frame structure of the unit J and is connected through a coupling to a gear reduction unit 122 and through couplings to a cross drive shaft 123 to a pair of end-positioned gear sets 127. As indicated in FIGURE 6A, each gear set 127 is operatively connected to the stub shaft of a driven wheel 120a that is splined or keyed thereon. In this manner, the trolley unit J can be moved longitudinally along and with respect to the bridge frame G.

A scrap box or somewhat cylindrical hopper 125 (see FIGURES 5 and 6A) is carried by the frame structure of the unit J and projects downwardly therefrom. Scrap bucket 126 is secured to project downwardly from the hopper 125 as a continuation of its inner passage wall 125a to receive scrap materials therefrom. It will be noted that the wall portion 125a of the hopper 125 forms a common wall with the scrap bucket 126 to guide the materials in their downward flow from the top of the hopper. The hopper 125 has an upper, inwardly-sloped, side guide portion 125b to receive materials from the conveyor 135 and feed them in a converging manner into the area defined by the wall 125a.

The scrap bucket 126 has a cylindrical reinforcing band 127 secured thereabout that is also secured to the bottom of the hopper 125 for providing a pivot mounting for a pair of clam shell closure gates 128. As shown, the gates or gate halves 128 are mounted at their inner lever ends on the reinforcing band 127 by pivot pins 129 to swing outwardly and upwardly therefrom when scrap is to be delivered to an aligned furnace vessel A. Chains 131 are secured by bifurcated connections 130 to outer ends of the gate halves 128 to lift them to their open positions; these gates are adapted to fall by gravity to close-off the open bottom end of the bucket 126. The upper end of each chain 131 is secured on a sprocket mount 132 that is fixed to the end of a piston rod 133a of a fluid or hydraulic operated fluid motor 133. When the motors 133 are actuated to draw-in their piston rods 133a, as by the application of fluid pressure to their lower ends, the chains 131 are raised to, in turn, swing the gates 128 outwardly and deliver scrap material directly into a furnace A. It will be noted that the heavy duty scrap conveyor 135 has plenty of time to fill the hopper 125 and bucket 126 while the unit I is in the position of FIGURE 5 during the blow-refining of metal in the furnace vessel A.

Figure 10:
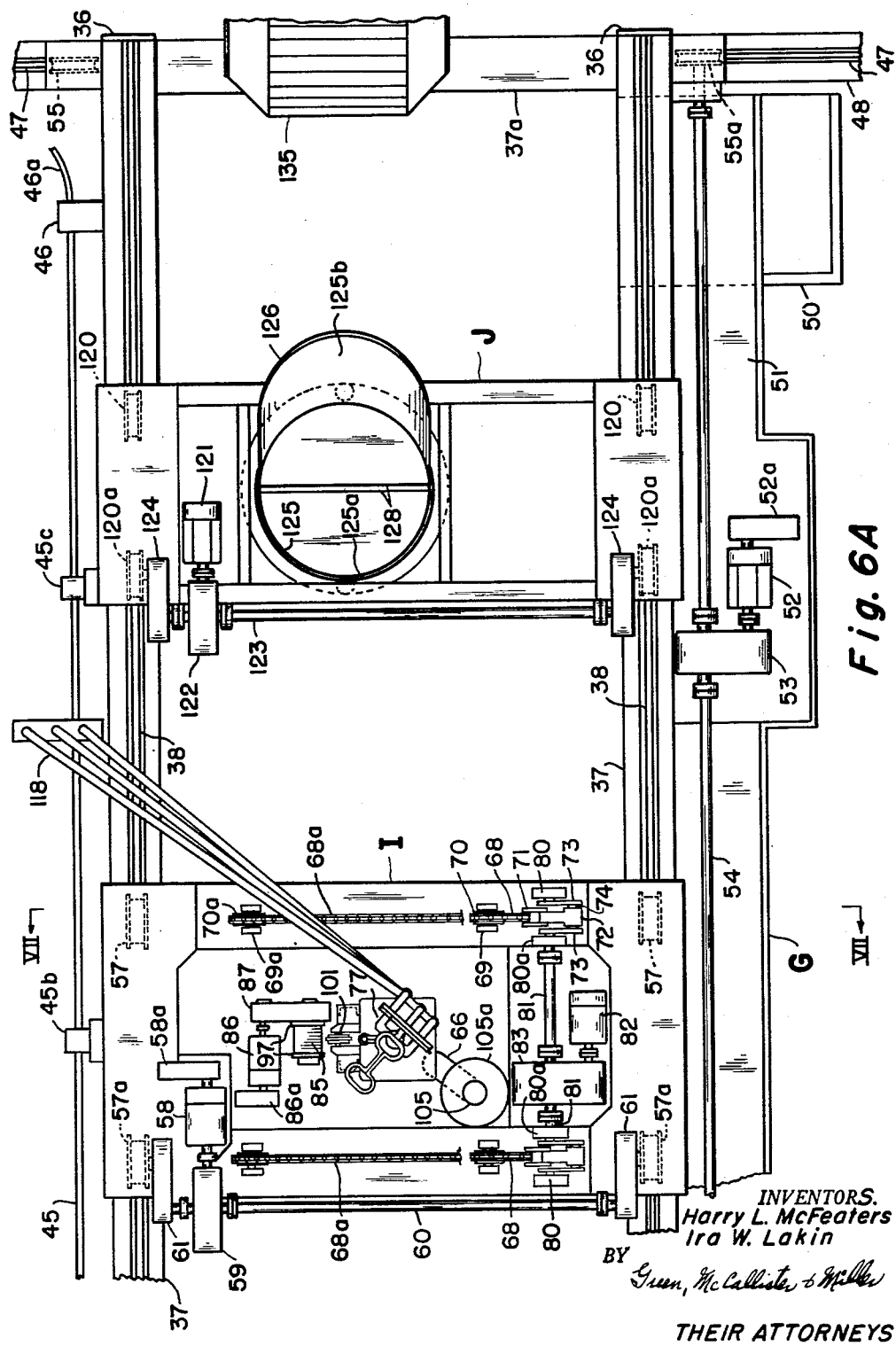
FIGURE 10 is an enlarged side view showing an improved form of teeming ladle unit of our construction which is adapted to be raised and lowered and which may be self-propelled for movement along a track; this figure shows the ladle in its uppermost or initial pour-receiving position.
Figure 11:
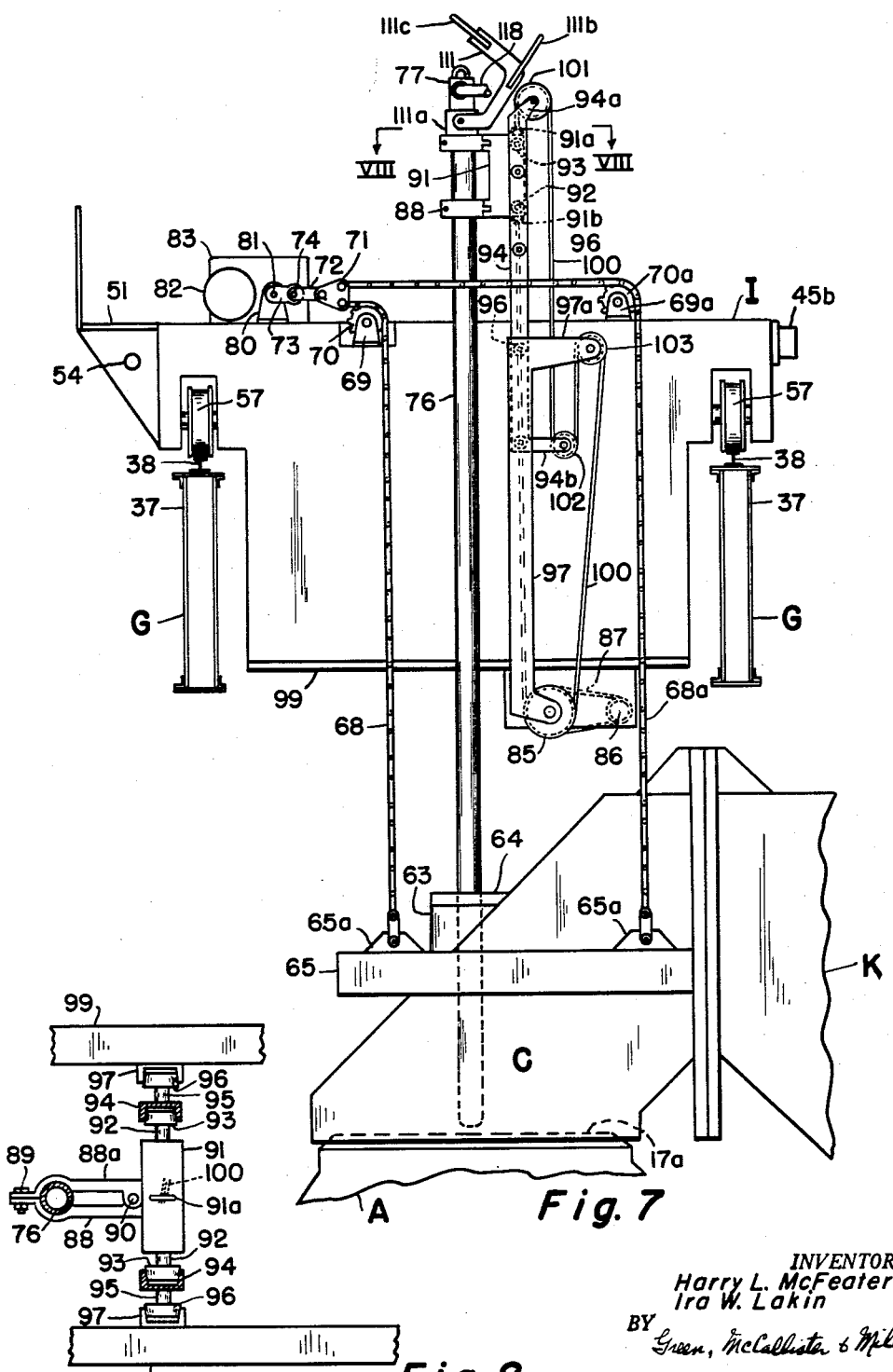
FIGURE 11 is a view on the scale of FIGURE 10 showing the teeming ladle in its lowermost position, such as may be effected near the end of the tilting operation of the vessel and the completion of the pouring of molten metal therefrom.

We have devised a new and improved form of teeming ladle construction E, as illustrated in FIGURES 10 and 11 of the drawings. The ladle 144 is mounted on the base of a self-propelled transfer car or truck 145 and is preferably lined as by refractory material to protect its metal wall. It will be noted that the car 145 has side rails and a central portion that is downwardly-offset and open to receive the ladle 144 and its bottom tilt eyelet 149 when the ladle is in its "down" position of FIGURE 11.

A ladle stopper 147 is carried by an upwardly-projecting integral support 146 along the side thereof. A ladle support or cradle frame or yoke 151, of similar construction and mounting on each side of the car 145, directly carries the ladle 144. The cradle frame 151 has an upwardly and outwardly or horizontally-extending pair of arms 151a that extend therefrom intermediate its opposite sides. The arms 151a are secured to and rest on upper ends of piston rods 154. The frame 151, on each side thereof, defines a central, downwardly-offset seat 151b to receive one of a pair of rectangular, outwardly-projecting side blocks 150 of the ladle 144, in such a manner that the ladle 144 may be lifted into and out of position thereon by employing hoist hooks 23' in an engaging position with its side pins or trunnions 148 (see also FIGURE 12).

A centrally-positioned pair of upwardly-positioned hydraulic or fluid motors or cylinders 153 are secured to the platform of the car 145 to actuate the pistons 154 to raise and lower the frame or cradle 151 and thus to simultaneously raise and lower the ladle 144 carried thereby. It is thus apparent that the ladle 144 can be moved to its uppermost raised position of FIGURE 10, to any intermediate position, and to its lowermost position of FIGURE 11, so as to effect full cooperation and adjacency of its open mouth with respect to the pouring nose of the vessel A when metal is being poured therefrom and while the vessel is being turned to complete the pouring operation.

Figure 12:
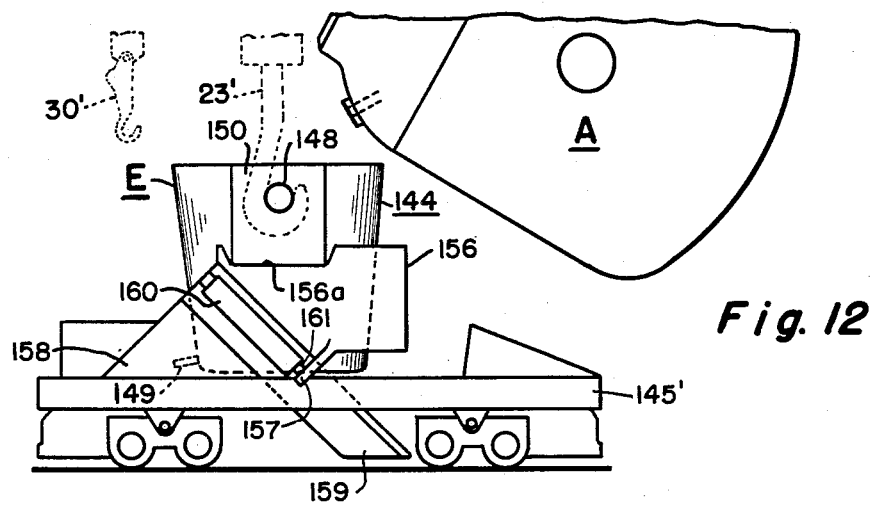
FIGURE 12 is a view on the scale of FIGURE 10 showing a modified type of teeming ladle unit which is capable of both raising and lowering as well as horizontal position-change relationship with respect to the vessel being poured; this figure shows the ladle in its uppermost raised and forwardly-advanced position.
Figure 13:
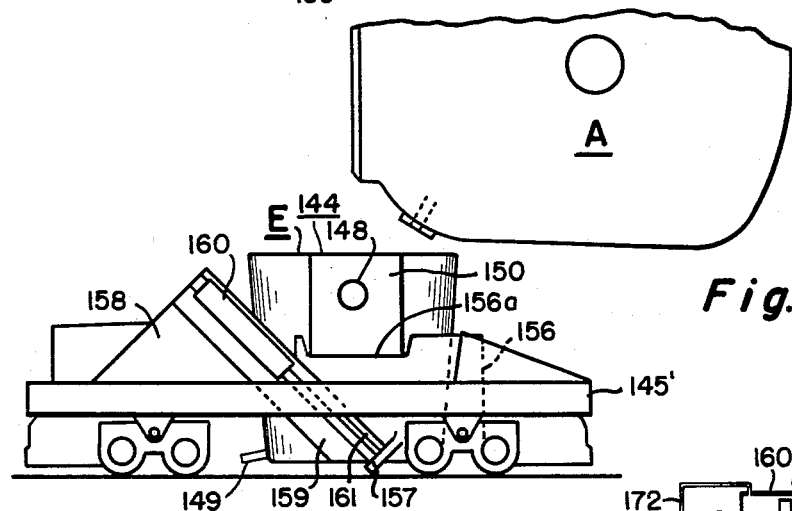
FIGURE 13 is a view on the scale of FIGURE 12 showing the teeming ladle of the same unit in its backwardly retracted and lowermost position with respect to the vessel being poured.
Figure 14:
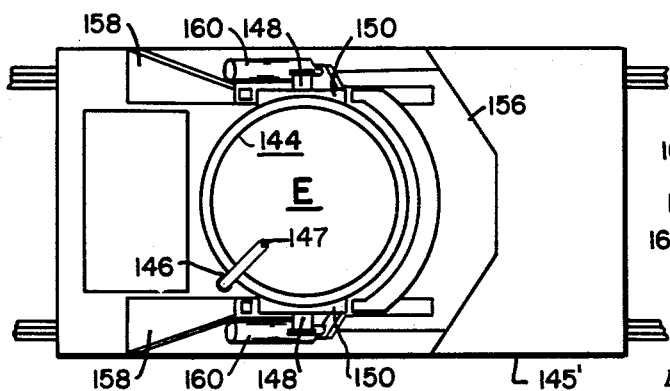
FIGURE 14 is a plan view of the unit of FIGURE 12 on the same scale as such figure.

In FIGURES 12 to 14, inclusive, we have shown a further improved type of teeming ladle construction E wherein the ladle 144 is raised and lowered on an inclined plane to effect a cooperative raising and lowering and simultaneous back and forth movement with respect to the metal being poured from the vessel A. This construction eliminates the need for moving the car 145', itself, along its track to maintain a horizontal alignment of the ladle with the furnace pour.

In FIGURE 12, we have shown the hook 123' of an overhead hoist which is adapted to engage trunnions 148 of the ladle to lift it into and out of its seating position with respect to the ladle support, cradle frame or yoke 156. At this time, a hook 30' of a second overhead hoist may be employed to engage eyelet 149 to tilt the ladle 144 and pour molten metal therefrom. This is also true as to the embodiment of FIGURES 10 and 11.

In the construction of FIGURE 12, the platform of the truck 145' carries a pair of side mounts or stands 158 for the ladle lifting mechanism. Each stand 158 is secured to project upwardly from the platform and has a backwardly or obliquely declining track or rail part 159 to guide the ladle-positioning frame support, cradle frame or yoke 156 in its up and down movement. It will be noted that the frame 156 has a central, downwardly-offset seat 156a on each of its sides for receiving the blocks 150 of the ladle 144 and is provided with an angle bracket 157 on each of its sides extending downwardly therefrom and to which the end of a piston rod 161 is secured.

A fluid or hydraulic motor 160 is secured to each inclined track or rail part 159 and is adapted to actuate its piston rod 161 to move a corresponding side of the frame 156 between its uppermost position of FIGURE 12 and its lowermost position of FIGURE 13, or vice versa. It will be noted that the central portion of the platform of the car 145' is open to permit the lower end of the ladle 144 to pass therethrough to its lowermost position of FIGURE 13. At this time, the cradle frame 156 rests on the platform of the car. In this manner, the ladle 144 is moved upwardly-forwardly or outwardly when the cradle frame 156 is raised and is moved backwardly-downwardly or inwardly when the cradle frame is lowered.

In FIGURE 15, we have disclosed, somewhat diagrammatically, a suitable fluid operating system for controlling the raising and lowering movement of the yoke or cradle frame 156 for the ladle. One end of the cylinder of each fluid motor 160 is shown connected by a fluid line 171 to a fluid pump 170. It will be noted that the pumps 170 are connected by a common shaft to operate together or in synchronism. Fluid lines from the pumps 170 are connected to a three-way (including a shut-off position for all fluid flow) flow control valve 168. One of the alternate flow lines of the valve 168 is connected through line 166 and an electric motor-driven fluid pump 167 to a source or reservoir 165 for the fluid. The other alternate line of the valve 168 is connected through line 169 directly to the reservoir 165. The other ends of cylinders of the fluid motors 160 are connected together by line 172 and by such line to the reservoir 165.

When the control valve 168 is turned to provide direct flow from the driven pump 167 (whose electric motor is then actuated) through pumps 170 (actuating them by the positive fluid pressure flow) to the lines 171, equalized positive fluid pressure is thus applied to the pistons of the motors 160 to positively drive or move their piston rods to the left of FIGURE 15 (which constitutes the raising movement for the yoke 156).

On the other hand, when the electric motor for the pump 167 is shut-off and the valve 168 is turned to connect the motors 170 with the line 169, they are no longer positively driven by the positive movement of pressure fluid from the driven pump 167, thus the front ends of the cylinders 160 may be exhausted and the yoke 156 and the teeming ladle 140 will return to the down position of FIGURE 13 by reason of the weight of the apparatus. It will be noted that lines 172 are exhaust lines for the motors 160 when the motors 160 are being positively moved to raise the yoke frame 156. The system of FIGURE 15 may be applied in the same manner to operate the fluid motors 153 of the construction of FIGURES 10 and 11. The control valve 168 may be shut-off or opened only partially to hold the yoke frame 151 or 156 in any desired raised or lowered position and to control the rate at which the yoke frame is moved.

With particular reference to FIGURES 3 and 4 of the drawings, we have provided a furnace installation, system or layout which makes use of an overhead track or runway 47 that projects longitudinally of the installation between furnace vessels A and further, in such a manner as to bridge the spacing between a longitudinally-aligned group of furnace vessels, so that one or more of the vessels may be serviced by one assembly or by a group of transverse servicing assemblies mounted for sidewise movement along the runway. At least one servicing assembly is employed for each pair of furnace vessels and includes an overhead supporting or bridging traveling frame G that extends transversely of the first-mentioned runway 47 and, in effect, crosswise above and beyond the furnace vessels A of a longitudinally-aligned group. Each bridging frame G, in turn, has or constitutes a runway on which furnace vessel servicing units are mounted for movement therealong into and out of an overhead cooperating station or position alignment with a furnace vessel for the purpose of servicing it.

The operating or servicing units on each traveling frame G have means for moving them to and from servicing stations as to the vessel, as to a stationary effluent receiver K, and as to a servicing station for at least one of the units. For example, the operating, servicing or trolley unit J is adapted to be moved towards one end of the second or transverse runway for receiving scrap material from the conveyor 135, so that its hopper may be filled while a second servicing unit, such as the hood and lance trolley unit I, is in a servicing position with respect to a furnace vessel and an effluent receiver.

As illustrated in FIGURE 4, we contemplate the employment of an additional transverse runway or overhead traveling frame G on the same longitudinal runway 47, so that each furnace A of a series of longitudinally spaced-apart furnaces of the installation may be independently serviced by the operating or servicing units of its own overhead transverse runway or of bridge frame G. However, a single transverse servicing assembly may be selectively employed for a pair of furnace vessels, as by using it in charging, carrying-off flame and effluent, providing an oxygen lance, etc. while the other furnace is being repaired or is idle.

Since the operating or servicing units on the transverse runway of each bridging frame G have independent means for actuating them, it is apparent that they can be used selectively, not only for moving them from station to station along the frame G, but also in effecting raising and lowering and other movements and servicing functions when one of them is at a particular station, such as at the furnace servicing station which is preferably a central station, as shown in FIGURE 4.

With particular reference to FIGURES 1, 5, 6A and 9, we make possible an aligned suspension of a series of lances in a lance loft 109 in such a manner that they may be progressively or selectively utilized, as needed. When a lance 76 that is being carried by the servicing unit I requires repair or replacement, it may be moved out of its operating position by lowering the hook 112a of the hoist 112 into engagement with the eyelet 111c of its bail 111 and then lifting it to clear the unit. If desired, the used lance may be moved into the left-hand slotted portion of the floor 110 of the pulpit of FIGURE 9, or moved to one side and dropped into a pit by moving the hoist 112 along its runway 114. Once the used lance is released, the hook 112a may then be inserted in the eyelet 111c of the "ready" lance and the hook 115a disconnected from the eyelet of its head 77. At this time, the "ready" or new lance may be lowered on the unit I and through the fingers of its lance carrier to a suitable operating position. The fingers of the lance carrier are then closed or clamped about the new lance to hold it in a suitable operating position. At this time, the furnace blowing operation may be continued, as desired. We also contemplate the provision of a pair of hoists 112 on the trackway 114, so that one can hold the replacement lance in a "ready" or substantially aligned "above" position, while the other is employed to remove the used lance.

What we claim is:

1. In a compact servicing assembly for selectively charging an open mouth tiltable furnace vessel that faces upwardly during charging and refining of metal material therewithin and that is tiltable downwardly to discharge a refined molten metal charge therefrom, the improvement comprising, an effluent-conditioning receiver having an inlet portion fixedly positioned in a spaced relation above the open mouth of the vessel when the vessel is in its upwardly facing position, an overhead support frame extending transversely of the inlet portion of the receiver and above the vessel and having a runway therealong projecting beyond opposite sides of the vessel, molten material receiving means movable into a cooperating position with the vessel and below the overhead support frame to receive refined metal from the vessel when it is tilted downwardly, at least a pair of trolley units positioned for movement along the runway to and from vertically-cooperating positions with the open mouth of the vessel; a peripherally enclosed hood carried by one of the trolley units and having a downwardly-depending open inlet portion for cooperating with the open mouth of the vessel to receive effluent and flame therefrom during the metal refining operation and having an upper open outlet portion for cooperating with the inlet portion of the receiver to deliver effluent thereto, all when the hood is moved into a vertically-cooperating position by the one trolley unit with respect to and above the vessel; conveying means provided for moving a metal charge for the vessel to a transverse side position adjacent the vessel; operating means on the one trolley unit for, when the hood has been moved by the one trolley unit to its vertically-cooperating position with the vessel, lowering the hood and simultaneously and respectively moving its inlet and outlet portions into cooperating alignment with the open mouth of the vessel and the inlet portion of the receiver and maintain the hood in such a lowered position during the refining of metal within the vessel and for raising the hood out of its cooperating alignment with and maintain it in an upwardly-spaced position with respect to the vessel during pouring of refined molten metal from the vessel and during charging of the vessel; carrying means on the other trolley unit for taking the metal charge from the conveying means, and means on the other trolley unit for actuating said carrying means when the other trolley unit is in a vertically-cooperating position with the open mouth of the vessel to discharge the metal charge into the open mouth of the vessel when the hood is in its upwardly spaced position; and means on each of the trolley units for individually moving them along the runway on the transverse support frame and for moving said carrying means and for selectively moving the hood, after the hood has been raised out of its cooperating alignment with and while it is being maintained in its upwardly-spaced position with respect to the vessel by said operating means, transversely into and out of vertically-cooperating positions with the open mouth of the vessel.

2. In a compact servicing assembly for selectively charging an open mouth tiltable furnace vessel that faces upwardly during charging and refining of metal material therewithin and that is tiltable downwardly to discharge a refined molten metal charge therefrom, the improvement comprising, an effluent-conditioning receiver having an inlet portion fixedly positioned in a spaced relation above the open mouth of the vessel when the vessel is in its upwardly facing position, an overhead support frame extending transversely of the inlet portion of the receiver and above the vessel and having a runway therealong projecting beyond opposite sides of the vessel, molten material receiving means movable into a cooperating position with the vessel and below the overhead support frame to receive refined metal from the vessel when it is tilted downwardly, at least a pair of trolley units positioned for movement along the runway to and from vertically cooperating positions with the open mouth of the vessel; a peripherally enclosed hood carried by one of the trolley units and having a downwardly-depending open inlet portion for cooperating with the open mouth of the vessel to receive effluent and flame therefrom during the metal refining operation and having an upper open outlet portion for cooperating with the inlet portion of the receiver to deliver effluent thereto, all when the hood is moved into a vertically-cooperating position by the one trolley unit with respect to and above the vessel; conveying means provided for moving a molten metal pouring ladle to a transverse side position adjacent the vessel and beneath the overhead support frame; operating means on the one trolley unit for, when the hood has been moved by the one trolley unit to its vertically-cooperating position with the vessel, lowering the hood and simultaneously and respectively moving its inlet and outlet portions into cooperating alignment with the open mouth of the vessel and the inlet portion of the receiver and maintain the hood in such a lowered position during the refining of metal within the vessel and for raising the hood out of its cooperating alignment with and maintain it in an upwardly-spaced position with respect to the vessel during pouring of refined molten metal from the vessel and during charging of the vessel; means on the other trolley unit for raising the molten metal pouring ladle from the conveying means into a raised cooperating position with the open mouth of the vessel, means on the other trolley unit for tilting the pouring ladle in its raised position to discharge molten metal into the vessel when the hood is in its upwardly-spaced position and the other trolley unit is in its vertically-cooperating position with the open mouth of the vessel; and means on each of the trolley units for individually moving them along the runway on the transverse support frame for moving the pouring ladle and for selectively moving the hood, after the hood has been raised out of its cooperating alignment with and while it is being maintained in its upwardly-spaced position with respect to the vessel by said operating means, transversely into and out of vertically-cooperating positions with the open mouth of the vessel.

3. In a compact servicing assembly for selectively charging an open mouth tiltable furnace vessel that faces upwardly during charging and refining of metal material therewithin and that is tiltable downwardly to discharge a refined molten metal charge therefrom, the improvement comprising, an effluent-conditioning receiver having an inlet portion positioned in a fixedly spaced relation above the open mouth of the vessel when the vessel is in its upwardly facing position, an overhead support frame extending transversely of the inlet portion of the receiver and above the vessel and having a runway therealong projecting beyond opposite sides of the vessel, molten material receiving means movable into a cooperating position below the support frame to receive molten material discharged from the open mouth of the vessel when it is tilted downwardly, at least a pair of trolley units positioned for movement along the runway to and from vertically-cooperating positions with the open mouth of the vessel; a peripherally enclosed hood carried by one of the trolley units and having a downwardly-depending open inlet portion for cooperating with the open mouth of the vessel to receive effluent and flame therefrom during the metal refining operation and having an upper open outlet portion for cooperating with the inlet portion of the receiver to deliver effluent thereto, all when the hood is moved into a vertically-cooperating position by the one trolley unit with respect to and above the vessel; a scrap bucket carried by the other of the trolley units in a downwardly-depending relation therefrom for charging scrap material into the open mouth of the furnace when the other trolley unit has moved the scrap bucket to a vertically-cooperating position with the open mouth of the furnace, conveying means positioned to feed charging material adjacent an end of the overhead support frame and a side of the vessel and into the scrap bucket when the other unit has been moved transversely on the runway to an outer end position on the runway; operating means on the one trolley unit for, when the hood has been moved by the one trolley unit to its vertically-cooperating position with the open mouth of the furnace, lowering the hood and simultaneously and respectively moving its inlet and outlet portions into cooperating alignment with the open mouth of the vessel and the inlet portion of the receiver and maintain the hood in such a lowered position during the refining of metal within the vessel and for raising the hood out of its cooperating alignment with and maintain it in an upwardly-spaced position with respect to the vessel during pouring of refined molten metal from the vessel and during charging of the vessel; actuating means on the other trolley unit for opening the scrap bucket to discharge scrap material into the open mouth of the furnace when the other trolley unit has moved the scrap bucket into its vertically-cooperating position with the open mouth of the vessel; and means on each of said trolley units for individually moving them along the runway on the transverse support frame, for moving the scrap bucket and for selectively moving the hood, after it has been raised out of its cooperating alignment with and while it is being maintained in its upwardly-spaced position with respect to the vessel by said operating means, transversely into and out of vertically-cooperating positions with the open mouth of the vessel, and for moving the scrap bucket to and from an outer end cooperating position with the conveying means.

4. In a compact coordinating servicing assembly for selectively charging an open mouth tiltable furnace vessel that faces upwardly during charging and refining of metal material therewithin and that is tiltable downwardly to discharge a refined molten metal charge therefrom, the improvement comprising, teeming ladle means movable into a cooperating position below the support frame to receive refined metal from the vessel when the vessel is tilted downwardly, an effluent conditioning receiver having an inlet portion positioned in a fixedly spaced relation above the open mouth of the vessel when the vessel is in its upwardly facing position, an overhead support frame extending transversely of the inlet portion of the receiver and above the vessel and having a runway therealong projecting beyond opposite sides of the vessel, a group of trolley units positioned for movement along the runway to and from vertically-cooperating positions with the open mouth of the vessel; a peripherally enclosed hood carried by one of the trolley units and having a downwardly-depending open inlet portion for cooperating with the open mouth of the vessel to receive effluent and flame therefrom during the metal refining operation and having an upper open outlet portion for cooperating with the inlet portion of the receiver to deliver effluent thereto, all when the hood is moved into a vertically-cooperating position with respect to and above the vessel by the one trolley unit; a scrap bucket carried by a second of the trolley units in a downwardly-depending relation therefrom for charging scrap material into the open mouth of the furnace when the second trolley unit has moved the scrap bucket to a vertically-cooperating position with the open mouth of the vessel, conveying means provided for moving a molten metal pouring ladle to and from a transverse side position adjacent the vessel and beneath the overhead support frame; operating means on the one trolley unit for lowering the hood and simultaneously and respectively moving its inlet and outlet portions into cooperating alignment with the open mouth of the vessel and the inlet portion of the receiver and maintain the hood in such a lowered position during the refining of metal within the vessel and for raising the hood out of its cooperating alignment with and maintain it in an upwardly spaced relation with respect to the vessel during pouring of refined metal from the vessel and during charging of the vessel, means on a third of the trolley units for raising the pouring ladle from the conveying means to a position above the open mouth of the vessel, means on the third trolley unit for tilting the pouring ladle to discharge molten metal into the open mouth of the vessel when the pouring ladle is raised and the third trolley unit is in its vertically-cooperating position with the open mouth of the vessel and the hood is in its upwardly spaced position, means on the second trolley unit for opening the scrap bucket to discharge scrap material into the open mouth of the vessel when the second trolley unit is in its vertically-cooperating position with the open mouth of the vessel; and means on each of said trolley units for individually moving them along the runway on the transverse support frame and for selectively moving the hood after it has been raised out of its cooperating alignment with and while it is being maintained in its upwardly-spaced position with respect to the vessel by said operating means, and for selectively moving the pouring ladle and the scrap bucket, transversely into and out of vertically-cooperating positions with the open mouth of the vessel.

5. In a compact servicing assembly for selectively servicing an open mouth tiltable furnace vessel that faces upwardly during the charging and refining of metal material therewithin and that is tiltable downwardly to discharge a refined molten metal charge therefrom, the improvement comprising an effluent-conditioning receiver having an inlet portion fixedly positioned in a spaced relation above the open mouth of the vessel when the vessel is in its upwardly facing position, a runway positioned in an overhead relation above the vessel and above the receiver to extend across opposite sides of the vessel, at least one trolley unit operatively positioned for movement along the runway, a peripherally enclosed hood defining a passageway therethrough carried by the trolley unit and having a downwardly-depending open inlet portion for cooperating with the open mouth of the vessel to receive effluent and flame therefrom during the metal refining operation and having an upper open outlet portion for cooperating with the inlet portion of the receiver to deliver effluent thereto, all when the hood is moved into a vertically-cooperating position by the trolley unit with respect to and above the open mouth of the vessel, an oxygen lance, the hood having a by-pass port for the oxygen lance open downwardly therethrough to its passageway; operating means on the trolley unit for, when the hood has been moved by the trolley unit to its vertically-cooperating position with the open mouth of the vessel, lowering the hood and simultaneously and respectively moving its inlet and outlet portions into cooperating alignment with the open mouth of the vessel and the inlet portion of the receiver and maintain the hood in such a lowered position during the refining of metal within the vessel and for raising the hood out of its cooperating alignment with and maintain it in an upwardly spaced position with respect to the vessel during pouring of refined molten metal from the vessel and during charging of the vessel, a carrier for the oxygen lance positioned on the trolley unit and having means to lower and raise the lance through the by-pass port of the hood into and out of the open mouth of the vessel when the hood is in its cooperating alignment with the vessel; and means on the trolley unit for moving the hood and said carrier along the runway, after the hood has been raised out of its cooperating alignment with and while it is being maintained in its upwardly spaced relation with respect to the vessel by said operating means.

6. A compact servicing assembly as defined in claim 5 wherein, a lance loft is positioned above the runway in substantial vertical alignment with the vessel, means supports a group of oxygen lances within said loft, and means is operatively positioned adjacent to and controlled from said loft to select and lower a lance therefrom to said carrier when the trolley unit is in its vertically-cooperating position with the open mouth of the vessel.

7. A compact servicing assembly as defined in claim 5 wherein, a lance loft is mounted above the runway in substantial vertical alignment with the vessel, a group of oxygen lances are provided for the vessel, means suspends the group of said oxygen lances in progressive alignment from said loft, fluid supply connections are provided to one oxygen lance suspended from said carrier for supplying cooling fluid thereto and exhausting warm fluid therefrom and for supplying oxygen gas therethrough, a second set of said fluid connections are provided within said loft, means is operatively positioned within said loft for selecting one lance of the group of oxygen lances suspended therefrom and for moving the selected lance to a working position at which said second set of fluid connections may be secured thereto, and means is carried by said loft for suspending the selected lance with the second set of fluid connections secured thereto in a ready position above the vessel for replacement of the oxygen lance that is suspended by said carrier on the trolley unit.

References Cited in the file of this patent

UNITED STATES PATENTS

| | | |
|---|---|---|
| 2,693,749 | Houdek | Nov. 9, 1954 |
| 2,799,492 | Hobenreich et al. | July 16, 1957 |
| 2,803,450 | McFeaters | Aug. 20, 1957 |
| 2,804,295 | Brooke | Aug. 27, 1957 |
| 2,822,163 | McFeaters | Feb. 4, 1958 |
| 2,836,309 | McFeaters | May 27, 1958 |
| 2,889,597 | Griffiths | June 9, 1959 |
| 3,022,990 | McFeaters et al. | Feb. 27, 1962 |
| 3,026,102 | McFeaters | Mar. 20, 1962 |

FOREIGN PATENTS

| | | |
|---|---|---|
| 507,936 | Great Britain | June 23, 1939 |
| 568,237 | Canada | Dec. 30, 1958 |

OTHER REFERENCES

The Foundry, September 1950, page 127, copy in Scientific Library.

ABC of Iron and Steel, 6th Ed., by Reebel published by The Penton Publishing Co., Cleveland, Ohio, 1950, pages 122, 123, 124. (Copy in Sci. Library.)

Report on the Bessemer Process, Special Report No. 42, by the Iron and Steel Institute, pages 46 and 47, May 1949.

Journal of Metals, vol. 8, No. 6, June 1956, page 762 (copy in Sci. Library).